United States Patent [19]
Bauer et al.

[11] Patent Number: 4,790,199
[45] Date of Patent: Dec. 13, 1988

[54] MECHANICAL CONTROL DEVICE

[75] Inventors: Karl-Heinz Bauer, Bad Neustadt; Viktor Geiss, Hochheim, both of Fed. Rep. of Germany

[73] Assignee: Preh Elektrofeinmechanische Werke Jakob Preh Nachf. GmbH & Co., Bad Neustadt, Fed. Rep. of Germany

[21] Appl. No.: 145,733

[22] Filed: Jan. 15, 1988

Related U.S. Application Data

[63] Continuation of Ser. No. 802,704, Nov. 26, 1985, abandoned.

[30] Foreign Application Priority Data

Nov. 30, 1984 [DE] Fed. Rep. of Germany ....... 3444230

[51] Int. Cl.⁴ .............................................. F16H 21/16
[52] U.S. Cl. ............................................ 74/48; 74/25
[58] Field of Search ................ 74/99 A, 99 R, 47, 49, 74/54, 25, 23, 22 R, 48

[56] References Cited

U.S. PATENT DOCUMENTS

| | | | |
|---|---|---|---|
| 2,826,921 | 3/1958 | Allen | 74/22 |
| 2,830,457 | 4/1958 | Dyer et al. | 74/47 |
| 3,490,518 | 1/1970 | Herbon | 165/42 |
| 3,864,869 | 2/1975 | Leuenberger | 74/99 R X |
| 3,886,789 | 6/1975 | Brookfield | 74/22 R X |
| 4,026,196 | 5/1977 | Olofsson | 74/22 R X |
| 4,154,119 | 5/1979 | Chapman | 74/47 |
| 4,436,163 | 3/1984 | Simpson | 74/22 R X |
| 4,685,350 | 8/1987 | Bauer et al. | 74/501 R |

Primary Examiner—Allan D. Herrmann
Assistant Examiner—David Novais
Attorney, Agent, or Firm—Woodcock Washburn Kurtz Mackiewicz & Norris

[57] ABSTRACT

In a control device, especially for heating and ventilation systems in motor vehicles, comprising a rotatable control knob and a linearly movable setting member, a lever is provided for coupling the knob and member and converting rotational motion of the knob into linear movement of the setting member. To achieve this, the control knob 2 is provided with a guide slope extending at an acute angle to the axis of rotation. A shorter arm portion of the lever is controlled by the guide slope. A longer arm portion of the lever is actuated by movement of the shorter arm portion against the guide slope and acts upon a coupled setting member in a linear manner.

9 Claims, 4 Drawing Sheets

MECHANICAL CONTROL DEVICE

This is a continuation of application Ser. No. 802,704, filed Nov. 26, 1985 now abandoned.

FIELD OF THE INVENTION

The present invention pertains to mechanical control devices, especially for heating or ventilation systems in motor vehicles, and, in particular, one comprising a control knob disposed on the front side of a front panel and rotatable around an axis of rotation for moving a connected setting member in either direction along a linear path.

BACKGROUND OF THE INVENTION

Control devices of this kind are often used in the dashboards of motor vehicles. They are used to set the opening of distributor flaps for controlling air circulation. Guided pulling and pressing cables are used as setting members.

A control device of this type, employing a control lever rather than by a control knob, is described in U.S. Pat. No. 3,490,518. This control lever is connected with a rotary member to whose circumference are attached Bowden cables. These cables are moved in a plane perpendicular to the axis of rotation of the member. This is often an undesirable orientation for installation, particularly if a rotary operating control knob is to be provided.

SUMMARY OF THE INVENTION

It is an object of the present invention to provide a mechanical control device which converts rotary movement of a control knob into a linear movement for use in adjusting a coupled setting member.

It is another object to provide such a device with only a few components.

It is another object to provide such a device in which relatively long travel of the setting member is achieved by relatively small angles of rotation of the control knob.

It is another object of the invention to provide a control device translating rotational motion of a control knob into a magnified linear motion so that a desired range of linear motion can be achieved independently of the size of the control knob The above objects and others are accomplished according to the present invention with a control device including a control knob mountable through a support panel for rotation and a setting member linearly movable by the control arm, by the provision of a guide slope on the control knob extending at an acute angle to the axis of rotation of the knob and a lever having a first, shorter lever arm portion in contact with the guide surface and a second, longer lever arm portion adapted for coupling with a setting member to act upon the setting member for linear motion thereof. Both the surface and the lever are provided on the back side of the support panel.

One beneficial aspect of the invention is that only a few components are needed for transforming the rotary movement of the control knob into linear movement. Another beneficial aspect of the invention is that the linear movement can be parallel or oblique to the axis of rotation, as desired. This permits compact design of the control device. It is also a beneficial aspect of the invention that the travel of the longer lever arm is practically independent of the diameter of the control knob. Consequently, it is unnecessary to provide a control knob of large diameter to accommodate a long linear travel, which would increase the size of the space necessary for installation of the device. The necessary displacement of the setting member can be achieved by a smaller angle of rotation of the control knob.

In two examples of the present invention, the guide slope is formed by an elliptical oblique surface on a coaxial extension of the control knob, and the lever is supported by suitable means so as to be swung around a pivot axis which is perpendicular to the axis of rotation of the control knob and is further located in the plane of the oblique surface. During the rotation of the control knob, the oblique surface swings the lever by its shorter lever arm portion. The setting member is moved by an extent corresponding to the slope of the oblique surface with respect the axis of rotation and to the ratio of a longer lever arm portion to the shorter lever arm portion.

The lever preferably lies on the oblique surface on both sides of the pivot axis. A guiding means which presses the lever against the oblique surface is therefore unnecessary. Also, the oblique surface preferably forms the end of the coaxial extension. This reduces the number of components and simplifies manufacture and construction In two other examples of the present invention, the guide slope is formed by a bore on an end of the control knob, which extends obliquely to the axis of rotation. The lever includes a bend between its two ends. A shorter one of two arms of the lever is rotatable in the said bore while a longitudinal guide is provided for receiving a longer one of the two arms of the lever. Due to the oblique position of the bore, part of the longer lever arm near the bend moves on a circle during the rotation of the control knob. The combination of pivoting, bending of the lever and longitudinal guiding limits the range of movement of the end of the longer lever arm remote from the bend to the diagonal of this circle.

The control devices described have a structure such that the longer lever arm performs its maximum travel when the control knob is rotated by less than 360°.

Further advantageous embodiments of the present invention will become apparent from the accompanying figures and detailed description of the invention.

DETAILED DESCRIPTION OF THE INVENTION

In all figures, a setting member 14, in the form of a push-pull cable is actuated in a linear manner by rotation of control knob 2 by an operator. The control knob 2 is mounted through a support panel 1 and is supported by the panel 1 for rotation around an axis of rotation 3. A front side of the knob 2 is configured for grasping by an operator.

Figure 1:
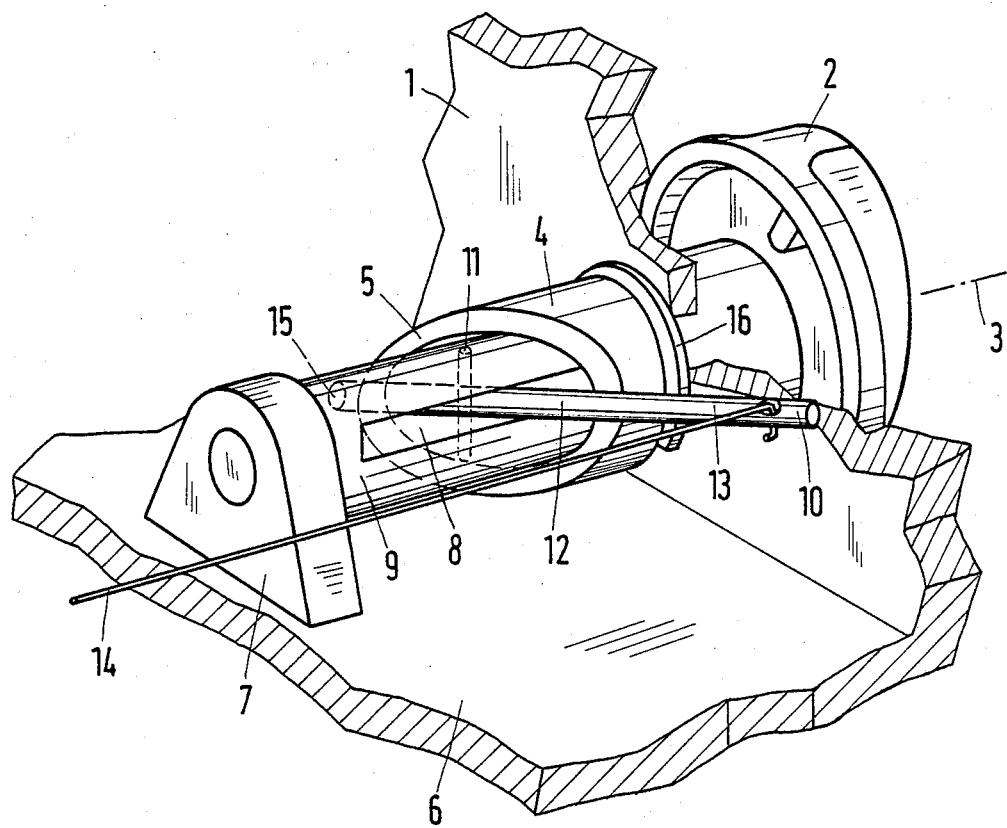
FIG. 1 shows a perspective back view of a first control device.
Figure 2:
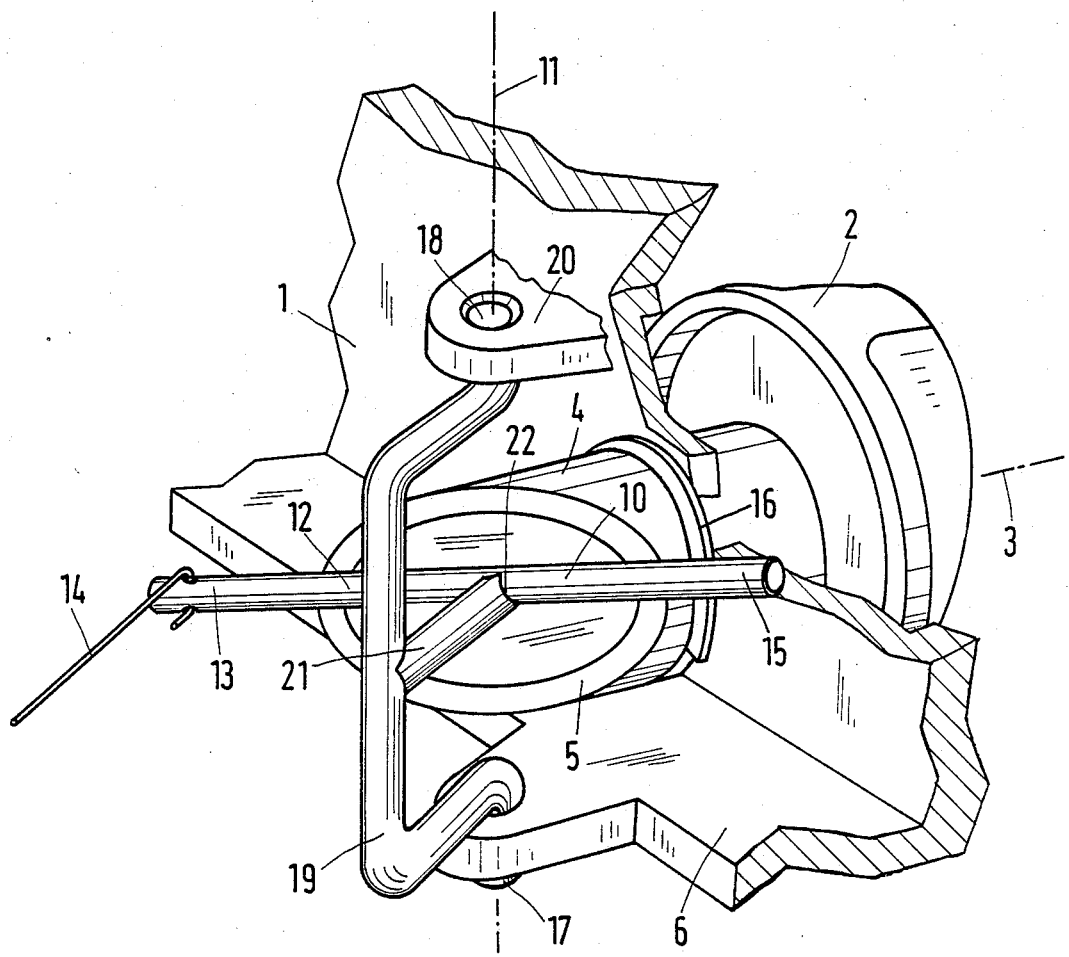
FIG. 2 shows a perspective back view of a second control device similar first.

In the examples according to FIGS. 1 and 2, the control knob 2 has a cylindrical extension 4 which is coaxial with the axis of rotation 3 and terminates in an elliptical oblique surface 5 at its remote end on the back side of the support plate 1. The plane formed by the surface 5 intersects the axis of rotation 3 obliquely and forms an acute angle with the axis of rotation 3.

In the example according to FIG. 1, a pivot support pin 9 provided with a slot 8, both coaxial to the axis of rotation 3, extends into the extension 4. The support pin 9 is mounted on a chassis 6 in a support block 7. A lever 10 is received in the slot 8. The lever 10 is pivotally mounted to swivel on a pivot axis in the slot 8 by means of a pin 11 coaxial with the pivot axis and supported by the pivot support pin 9. Alternatively, a boss coaxial with the axis of rotation 3 could be provided in the slot 8 pivotally pinning the lever 10 against the surface 5.

The lever 10 in FIG. 1 is formed by a straight piece of rod. The control knob 2 is secured against axial displacement with respect to the panel 1 by a snap ring 16 on the extension 4. Stops to limit the rotary movement of the control knob to a value below 360° can be provided on the control knob 2 or on the extension 4, if desired. One lever arm portion 15 is formed by one side of the lever 10 extending away from the pivot axis pin 11 and lies on the oblique surface 5. The remainder of the lever 10 extending away from the pivot axis pin 11 and arm 15 can be viewed as forming a pair of arm portions 12 and 13. Arm portion 12, which is the shorter of the two arms portions 12 and 13 as viewed from the pivot axis pin 11, extends from that axis into contact with the oblique surface 5. Arm portion 13 extends from the pivot axis pin 11 to the remote end of the lever 10. Attached to the end of lever arm 13 remote from the pivot axis pin 11 end, is the control setting member provided by a pulling and pressing cable 14. The end of the arm 13 is adapted for coupling with the cable 14 by the provision of a bore receiving an end of cable 14.

The control device according to FIG. 1 operates as follows. When the control knob is turned away from the position shown in FIG. 1, the oblique surface 5, which presses the shorter lever arm 12, provides a guide surface for the arm 12 so that the lever pivots around the axis pin 11. The longer lever arm 13 now pushes the pulling and pressing cable 14 away from the front panel 1. The length of the travel path of cable 14 is dependent on the angle of rotation of the control knob 2, the slope of the oblique surface 5 relative to the axis of rotation 3 and the ratio of the length of the lever arm 13 to that of the lever arm 12. The maximum travel of the setting member 14 in the example is reached after rotation of 180° from the depicted position. If the control knob is turned farther or back from this position, the oblique surface 5 presses the other lever arm 15 to pivot lever 10 so that the pulling and pressing cable 14 is pulled back towards the panel 1. This arrangement avoids the necessity of another member holding arm 12 against the surface 5 when cable 14 is pulled.

The oblique surface 5 can also be asymmetric, for example a spiral supporting lever arm 12 and a groove along the inner circumference of extension 4 receiving the remote end of arm 15, so that the maximum travel of the setting member is reached only at an angle of rotation between 180° and 360°. If needed, the lever 10 can also be coupled with and simultaneously manipulate one or more additional setting members. The direction of the pulling and pressing cable 14 is shown in FIG. 1 substantially parallel to the axis of rotation 3. However, the pulling and pressing cable 14 can also be positioned and moved obliquely to the axis of rotation 3.

In the example according to FIG. 2, a straight lever 10 is supported to swing on a pivot axis 11 by means of a gimbal in the form of a bow 19 pivotally supported coaxially with the axis 11, rather than by a pin as in FIG. 1. The bow end 17 is supported on the chassis 6. The bow end 18 is supported in a support block 20 extending from the front panel 1. The lever 10 is firmly connected to the bow 19 via a web 21 intersecting the lever 10 at junction 22. The junction 22 is essentially in the plane of the oblique surface 5 formed in the end of the coaxial extension 4 of the knob 2 and is along the pivot axis 11. The lever 10 is thus arranged in the example of FIG. 2 in the same manner as it was arranged relative to the oblique surface 5 in the example of to FIG. 1.

The control device embodiment of FIG. 2 operates in the same way as does the embodiment shown in FIG. 1. The bow 19 carries the lever 10 as it is swung around the pivot axis 11.

Figure 3:
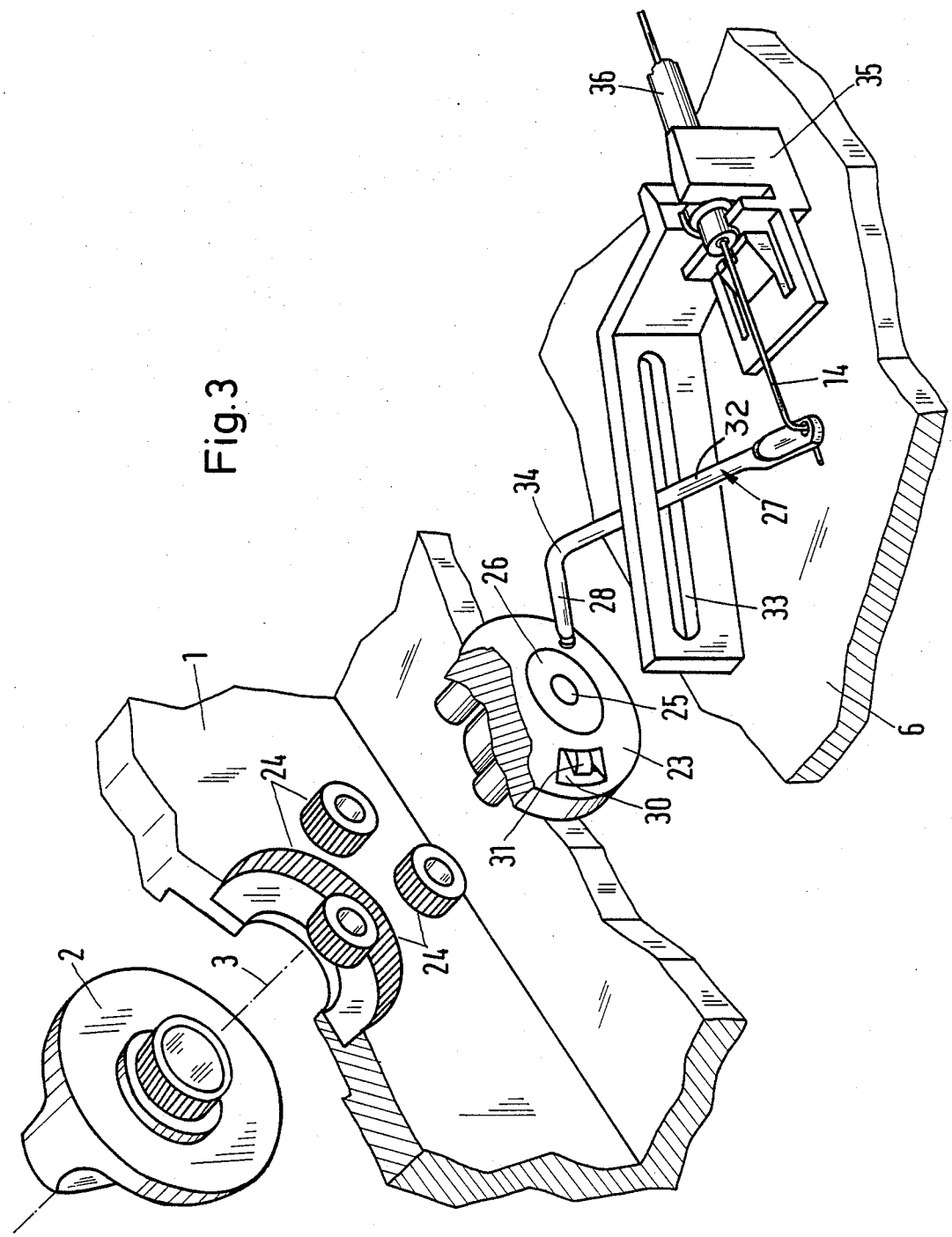
FIG. 3 shows a partially exploded perspective view of a third control device with a planet gear mechanism.
Figure 4:
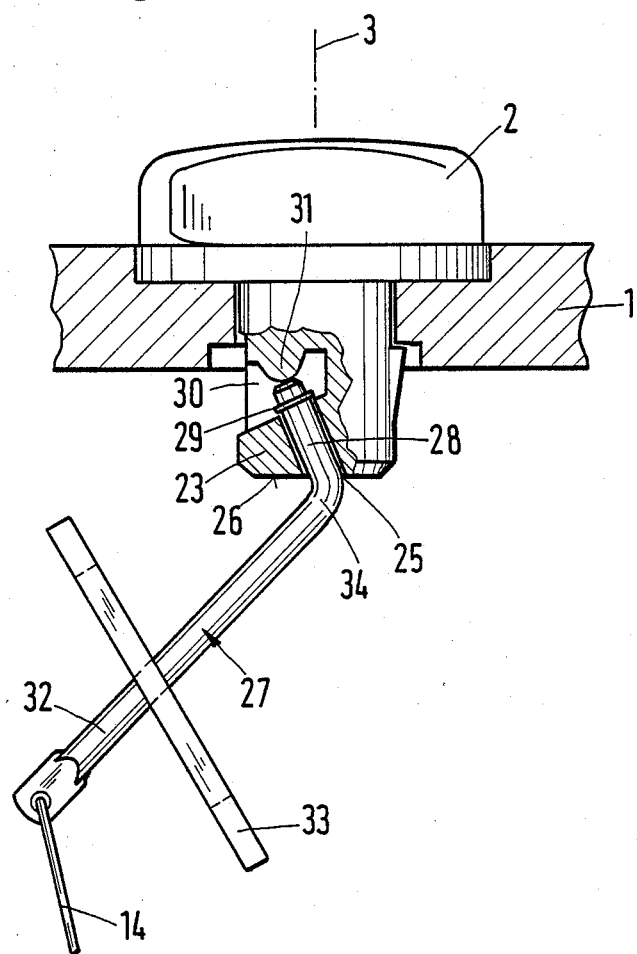
FIG. 4 shows a perspective view of a fourth control device similar to that of FIG. 3 but without planet gear mechanism.

In the examples of FIGS. 3 and 4, a rotary part 23 is provided on the back side of the control knob 2 passed through the panel 1. In the example according to FIG. 3, reduction gearing is provided by a planet gear mechanism 24 between the rotary part 23 and the control knob 2 coupling the two for differential rotation about axis 3. Each of the smaller gears is supported for rotation by a shaft on the rotary part 23. An inner circumferential gear on panel 1 couples an outer circumferential gear on the back of the knob 2 with the smaller gears for rotation of part 23 by the knob 2. In the example according to FIG. 4, the rotary part 23 is a coaxial extension of the control knob 2.

In each FIG. 3 and 4, a guide slope in the form of a bore 25 extending obliquely to the axis of rotation 3 of the knob 2 is provided on the rotary part 23 (This angular relation is best seen in FIG. 4). The bore 25 encloses an acute angle of between about 30° and 45° with the axis of rotation 3. The bore 25 in each FIGS. 3 and 4 opens in the middle of the front side 26 of the rotary part 23 turned away from the control knob 2 coaxial with axis 3. However, it can also open eccentrically to the axis of rotation 3 on the front side 26.

The shorter lever arm 28 of a bent lever 27 is inserted into the bore 25. The arm 28 is rotatably mounted in the bore 25 and is secured by means of a snap ring 29 (seen only in FIG. 4) which is inserted into a recess 30 in the side wall of the rotary part 23. The end of the lever 27 which is in the recess 30 is pivotally supported on a boss 31. The shorter arm 28 is in contact with the cylindrical wall of the bottom part 23 forming the bore 25 which also defines the guide surface of these two examples of the invention.

The lever 27 has a second longer lever arm 32 whose remote end is again provided with a bore for coupling the arm to an end of a pulling and pressing cable 14 which again acts as the setting member. The longer lever arm 32 is guided in a longitudinal guide 33. A bend 34 is provided in the lever 27 between the longer lever arm 32 and the shorter lever arm 28. The two lever arms 28 and 32 preferably enclose an obtuse angle of about 110° with each other at the bend. A holder 35 for the casing 36 of the pulling and pressing cable 14 is provided on the longitudinal guide 33 and is described in greater detail in a related application entitled "Device For Fixing The Casing Of A Flexible Pulling Or Pressing Member", Ser. No. 798,418 now U.S. Pat. No.

4,685,350, filed Nov. 15, 1985 incorporated by reference.

The control device according to FIGS. 3 and 4 operates in the following manner. When the rotary part 23 is rotated by means of the control knob 2 around the axis of rotation 3, the shorter lever arm 28 and the bend 34 are swung accordingly. The shorter lever arm 28 is rotated and guided by the bore 25. The end of the longer lever arm 32 is constrained by the longitudinal guide 33 to move along a straight line. The pulling and pressing cable 14 is moved accordingly.

The maximum travel of the longer lever arm 32 is reached after a rotation of 180°. The length of this travel is dependent on the angle enclosed between the bore 25 and the axis of rotation 3 and the angle of the bend 34.

The planet gear mechanism 24 of FIG. 3 is provided for those applications in which it is preferred that the maximum travel of the longer lever arm 32 be reached by rotation of the control knob 2 through an angle exceeding 180°.

As is apparent, the control devices described here when installed require only a small width and depth for operation. Therefore, it is possible to dispose them very close to each other. It is also favorable that the control devices require only a few simple component parts.

While several examples are described and variations thereto suggested, the invention is not limited to the embodiments but is defined by the accompanying claims.

We claim:

1. A control device for mechanically converting a distance of travel which occurs during rotary motion into a linear displacement which exceeds said distance of rotary travel comprising:
   control knob means having an end adapted for operator rotation about an axis of rotation and an opposing end, the rotation of said control knob means controlling the distance travelled during said rotary motion;
   lever means including a first, shorter arm member and a second, longer arm member joined to said first shorter arm member at an obtuse included angle thereby forming a bend in said lever means for coupling said control knob means and an linearly moving member;
   a bore in said opposing end of said control knob means intersecting said axis of rotation at an oblique angle, said bore receiving and obliquely supporting said first, shorter arm member of the lever means; and
   guide means receiving said second, longer member for constraining transverse movement of an end of said second arm member remote from said bend along a straight line, said straight line movement exceeding said distance travelled during rotary motion of said control knob means.

2. The control device of claim 1 wherein said bore intersects said axis of rotation at a surface of said opposing end of said control knob means.

3. The control device of claim 1 wherein said control knob means comprises:
   a first rotary element having one side adapted for operator control;
   a second, separate rotary element carrying said bore; and
   reduction gear means coupling said first rotary element and second rotary element for differentially rotating said two elements about said axis of rotation.

4. The control device according to claim 1 wherein said guide means is orientated at an oblique angle to said axis of rotation of said control knob means such that said guide means constrains movement along a straight line oblique to the axis of rotation of said control knob means.

5. A control device, especially for heating or ventilation systems in motor vehicles, comprising a control knob mountable through a panel and operable from one side of the panel, which is rotatable around an axis of rotation to define a distance of rotary travel, and a setting member movable by means of said control knob, characterized in comprising: a guide slope on the control knob on an opposing side of the panel and extending at an acute angle to the axis of rotation; and a lever having a shorter lever arm portion connected with the guide slope and a longer lever arm portion couplable with a setting member for linear movement exceeding said distance of rotary travel thereof; and further characterized in that the guide slope comprises a bore extending obliquely to the axis of rotation for receiving and rotatably supporting said shorter lever arm portion of the layer at an oblique angle, said lever having an obtuse angle bend between the shorter lever arm portion and the longer lever arm portion and the control device further comprises a longitudinal guide means for receiving and linearly guiding said longer lever arm portion.

6. The control device in accordance with claim 5, characterized in that the bore encloses an acute angle of between about 30° and 45° with the axis of rotation.

7. The control device in accordance with claim 5 characterized in further comprising: a rotary part containing the bore; and a planet gear means for coupling the rotary part and the control knob.

8. The control device in accordance with claim 5 characterized in that the angle of the bend is about 110°.

9. The control device according to claim 5 wherein said longitudinal guide means is orientated at an oblique angle to said axis of rotation of said control knob such that said longitudinal guide means constrains movement along a straight line oblique to the axis of rotation of said control knob.

* * * * *